United States Patent
Rajendran et al.

(10) Patent No.: US 8,301,105 B2
(45) Date of Patent: Oct. 30, 2012

(54) RECEIVER FRONT END

(75) Inventors: Gireesh Rajendran, Bangalore (IN);
Ashish Lachhwani, Bangalore (IN);
Rittu Kulwant Sachdev, Bangalore (IN); Rakesh Kumar, Ghazipur (IN)

(73) Assignee: Texas Instruments Incorporated, Dallas, TX (US)

( * ) Notice: Subject to any disclaimer, the term of this patent is extended or adjusted under 35 U.S.C. 154(b) by 603 days.

(21) Appl. No.: 12/540,368

(22) Filed: Aug. 13, 2009

(65) Prior Publication Data
US 2011/0039511 A1  Feb. 17, 2011

(51) Int. Cl.
*H04B 1/28* (2006.01)

(52) U.S. Cl. .......................... 455/326; 455/334

(58) Field of Classification Search .............. 455/131, 455/150.1, 161.1, 165.1, 173.1, 179.1–183.1, 455/313, 323, 326, 334
See application file for complete search history.

(56) References Cited

U.S. PATENT DOCUMENTS

| | | | |
|---|---|---|---|
| 7,680,477 B2 * | 3/2010 | Yanduru et al. | 455/340 |
| 2010/0007424 A1 * | 1/2010 | Savla et al. | 330/302 |

* cited by examiner

*Primary Examiner* — Nhan Le
(74) *Attorney, Agent, or Firm* — John R. Pessetto; W. James Brady; Frederick J. Telecky, Jr.

(57) ABSTRACT

A low-power receiver front-end includes a transconductance amplifier that produces a single-ended current signal in response to a single-ended voltage signal. An output of the transconductance amplifier is provided to an LC tuned circuit. At resonance, the LC tuned circuit generates a differential current signal in response to the single-ended current signal. Single-ended current signals corresponding to the resonant frequency of the LC tuned circuit are converted into differential signals. Further, the LC tuned circuit amplifies the differential current signals by an associated quality factor. Further, a mixer is coupled to an output of the LC tuned circuit. The mixer generates IF signals in response to the differential current signals.

7 Claims, 2 Drawing Sheets

RECEIVER FRONT END

TECHNICAL FIELD

Embodiments of the disclosure relate to low-power receiver front-ends.

BACKGROUND

Communication receivers typically include an antenna receiving radio frequency (RF) signals, a cascade of low noise amplifiers amplifying low level RF signals, filters tuning the RF signals at a required frequency, and mixers converting the RF signal to intermediate frequency (IF) signals. In addition, communication receivers include digital circuitry to reproduce a transmitted signal at the receiver end.

In mobile and wireless communications, power is a major criterion in receiver design considerations, followed by device size. Designers attempt to reduce power consumption and device sizes to provide superior battery life and smaller handsets. The devices from the antenna to the mixer are collectively termed as receiver front-end. The receiver front-end provides most of the amplification to the RF signals, reduces signal noise, removes unwanted signals, and converts the RF signals into IF signals for further processing. This stage includes a number of active devices that increase the power consumption considerably.

A typical receiver front-end employs differential signaling. This arrangement requires two pairs of transconductance amplifiers, which together increase the receiver's power consumption and introduce noise. Further, the second pair of transconductance amplifiers degrades overall linearity of the receiver front-end. Existing techniques attempt to reduce the power consumption in the receiver front-end stage. One such technique avoids the use of the second pair of transconductance amplifiers, but the resulting reduction in power consumption comes at the price of degrading the receiver front-end's quality factor and reducing its signal-to-noise ratio (SNR).

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the claimed invention are directed to a receiver front-end, which includes a transconductance amplifier that generates a single-ended current signal in response to a single-ended voltage signal. The receiver front-end further includes an LC tuned circuit, which is operatively coupled to the output of the transconductance amplifier. The LC tuned circuit, at resonance, generates a differential current signal in response to the single-ended current signal. In addition, a mixer is operatively coupled to the output of the LC tuned circuit.

BRIEF DESCRIPTION OF THE VIEWS OF DRAWINGS

DETAILED DESCRIPTION

The following detailed description is made with reference to the figures. Preferred embodiments are described to illustrate the claimed invention, not to limit its scope, which is defined by the claims. Those of ordinary skill in the art will recognize a variety of equivalent variations of the description that follows.

Figure 1:
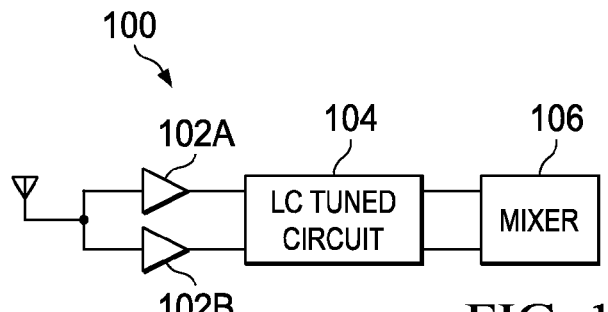
FIG. 1 depicts a typical prior art receiver front-end.

FIG. 1 is used to explain the operation of a typical receiver front-end to assist understanding the operation of the exemplary receiver front-end of the claimed invention. FIG. 1 depicts a typical receiver front-end 100, including two transconductance amplifiers 102A and 102B, and LC tuned circuit, and a mixer. The transconductance amplifiers 102A and 102B convert a single-ended voltage signal into differential current signals. The LC tuned circuit 104 filters the differential current signals and provides the differential signals to the mixer 106. This typical scheme employs two transconductance amplifiers, which increases the power consumption of the receiver as well as introduces noise. Further, amplification of the input signal is provided only at the transconductance amplifier 102 stage; so, considerable noise is present in the signal at the mixer 106. Moreover, the load impedance of the mixer 106 loads the LC tuned circuit 104 directly; thereby reducing an associated quality factor of the LC tuned circuit 104. This decrease in the quality factor value degrades the selectivity of the LC tuned circuit 104.

To improve the signal-to-noise ratio (SNR) of the signal and the selectivity of an LC tuned circuit, and to reduce power consumption, the claimed invention discloses a low-power receiver front-end that can be implemented in communication receivers. The exemplary low-power receiver front-end provides sufficient amplification to received narrowband Radio Frequency (RF) signals, removes unwanted signals, and presents differential RF signals to a mixer. Subsequently, the mixer converts the RF signals into Intermediate Frequency (IF) signals. The receiver front-end employs a transconductance amplifier as a low noise amplifier (LNA) converting a single-ended input signal into a single-ended current signal, and an LC tuned circuit, which is connected between the LNA and the mixer, remove unwanted signals, amplify the RF signal, and convert the single-ended current signal into differential signals. By employing one active device (a transconductance amplifier), the disclosed low-power receiver front-end reduces power consumption considerably. Further, the LC tuned circuit provides a high SNR by sufficiently amplifying the RF signals. Furthermore, removal of active devices from the exemplary receiver front-end reduces the overall noise, which provides additional improvement in the SNR. Moreover, the mixer connected at the LC tuned circuit output has very low load impedance, hence very low input impedance, which implies that the mixer does not load the LC tuned circuit significantly, leading to a higher filter quality factor (Q). Thus, the LC tuned circuit can be highly selective, and effectively blocks any interfering signals.

The above-stated and more advantages of the claimed invention will be explained with reference to the figures in the following sections.

Exemplary Environment

Figure 2:
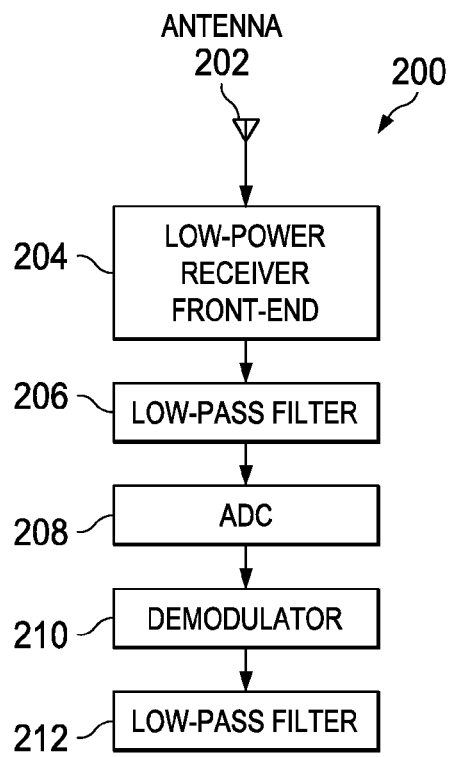
FIG. 2 depicts a block diagram of a receiver according to some embodiments of the claimed invention.

Referring now to the drawings, FIG. 2 is a generalized block diagram of an embodiment of a communication receiver 200 wherein one or more embodiments may be implemented. The receiver 200 comprises an antenna 202, a low-power receiver front-end 204, low-pass filters 206 and 212, an analog to digital converter (ADC) 208, and a demodulator 210. However, the teachings set out below can be implemented in a receiver having additional electronic components such as gain control devices, amplifiers, oscillators, and error correction devices.

The receiver 200 can be implemented in a variety of communication systems, including wireless communication systems, based on technologies such as, Bluetooth®, Wi-Fi, and others. Here, and in the discussion that follows, the receiver 200 is a wireless communication receiver such as a Bluetooth® receiver. It will be appreciated, however, that the receiver 200 can be any communication receiver known in the art.

It will be appreciated that the order of steps shown in FIG. 2 and other flow diagrams should not be understood as limitations. Various blocks can be combined, or their order changed, or functions can be separated, in any order to implement any of the systems falling within the ambit of the claims. Furthermore, the system can be implemented in any suitable hardware or device without departing from the scope of the invention.

The antenna 202 receives narrowband Radio Frequency (RF) signals from a transmitter, such as a Bluetooth® transmitter. The particular form of antenna types will be dictated by the requirements of the application in question. For example, Bluetooth® utilizes surface-mountable short-range antennas or embedded antennas. Other antenna types can be employed to implement the receiver 200 for other technologies. Typically, the antenna 202 receives a single-ended narrowband RF signal and provides that signal to the next stage.

The low-power receiver front-end 204 is the next block in the receiver 200. As shown, this element includes a transconductance amplifier and an LC tuned circuit, both of which are described in more detail in connection with FIG. 3, in the following section. Briefly, the transconductance amplifier receives a single-ended voltage input signal from the antenna 202 and converts it into a single-ended current signal. The LC tuned circuit acts as a filter, as it only passes signals corresponding to a resonant frequency. Moreover, the LC tuned circuit amplifies and converts the single-ended current signal into differential current signals at resonance. The low power receiver front-end 204 further includes a mixer, also discussed in the following section, which converts the RF signal into an intermediate frequency (IF) signal.

The IF signal at the output of the receiver front-end 204 is provided to the low-pass filter 206, which attenuates any RF component of a front-end output signal. Any low-pass filter that allows frequencies from zero to the IF can be implemented at this stage, such as RC filters, RL filters, LC filters, or active filters. Further, certain communication receivers require filters with high quality factors and selectivity, while others are more relaxed in their requirements. Depending on the required SNR, a suitable filter can be selected.

The ADC 208 converts the analog IF signal into a digital IF signal. Those skilled in the art will realize that any known ADC can be used to realize the receiver 200, such as flash, successive approximation, sigma-delta, or pipeline ADCs.

The digital signal produced at the ADC 208 output is provided to the demodulator 210, which as the name suggests, demodulates the digital signal. The input signal received at the antenna 202 is modulated during transmission to combine an information-carrying signal, such as an audio signal, with a high-frequency carrier signal, suitable for transmission on an assigned frequency. Demodulators separate the information signal from the carrier, and the demodulators can be implemented employing techniques such as Quadrature Phase Shift Keying (QPSK), Frequency shift keying (FSK), Phase Shift Keying (PSK), Gaussian Minimum Shift Keying (GMSK), and Gaussian Frequency Shift keying (GFSK). Those skilled in the art will be able to select suitable hardware for this portion of the receiver 200, depending on the receiver application. For example, in GSM, the GMSK demodulator can be used, while for Bluetooth® applications, a GFSK demodulator would be preferred.

Next, the low-pass filter 212 converts the demodulated signal into an analog signal, and this signal can be supplied to an output port, such as a speaker in a mobile phone. For data applications, the digital demodulated signal can be directly passed to the output, bypassing the low-pass filter 212.

Exemplary System

Figure 3:
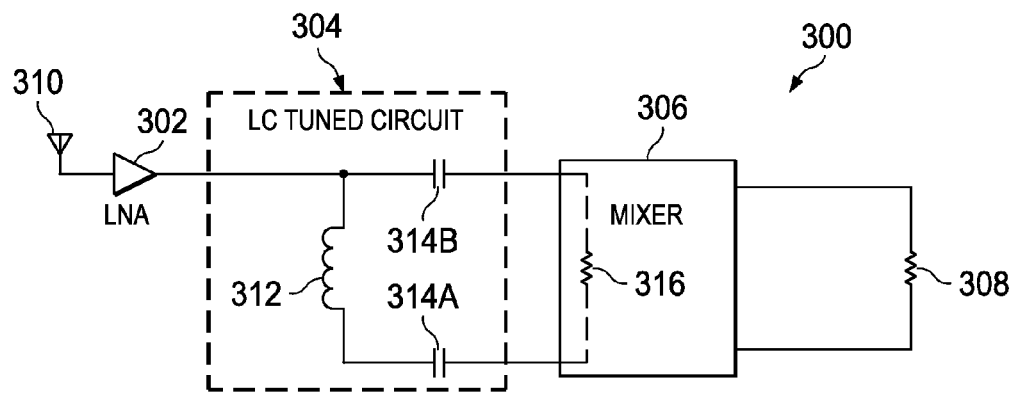
FIG. 3 depicts a block diagram of an exemplary receiver front-end.

FIG. 3 is an exemplary embodiment 300 of the low-power receiver front-end 204. The various devices included in the low-power receiver front-end 204 are a transconductance low-noise amplifier 302 (referred to as TA 302 hereinafter), an inductor-capacitor (LC) tuned circuit 304, and a mixer 306 with a load impedance 308. The TA 302 is connected between an antenna 310 and the LC tuned circuit 304. The LC tuned circuit 304 includes a series combination of an inductor (L) 312 and a first capacitor 314A, connected in parallel with a second capacitor 314B. The capacitance of each of the capacitors 314A and 314B is twice the required capacitance of the LC tuned circuit 304. For example, to achieve a certain resonant frequency, if the required capacitance of the LC tuned circuit 304 is 2 farads, then the capacitance of each of the capacitors 314A and 314B should be approximately 4 farads. LC tuned circuits are known in the art and thus will not be described in detail here. The capacitor 314B is connected in series with the output of the TA 302, and it provides an output to one input terminal of the mixer 306. The capacitors 314A and 314B further provide AC coupling between the LC tuned circuit 304 and two input terminals of the mixer 306. Effective input impedance 316 of the mixer 306 is depicted with dotted lines between the input terminals of the mixer 306. Those skilled in the art will understand the desirability of holding the input impedance 316 as low as possible. The following sections include a description of the devices in FIG. 3 along with their operation.

In one embodiment, the TA 302 can be implemented using exactly one TA 302. Transconductance amplifiers typically produce an output current signal that is proportional to the corresponding input voltage signal, thus acting as a voltage controlled current source (VCCS). The TA 302 removes low-signal noise from the input voltage signal, as the current produced for the low-voltage noise signal is practically negligible. A single-ended voltage signal is provided to the TA 302, such as a single-ended narrowband RF signal. Thus, the TA 302 operates to convert the single-ended voltage signal into a single-ended current signal. In one embodiment, a current amplification stage is present in the TA 302 to amplify the current signal. The current amplification stage can be selected with a certain gain, based on the amplification required by the TA 302.

The amplified current signal obtained from the TA 302 is provided to the LC tuned circuit 304, which attenuates all signals that do not correspond to the resonant frequency. The resonant frequency of the LC tuned circuit 304 is adjusted such that it corresponds to the frequency of the desired input signals. To this end, the values of the inductor 312 and capacitors 314 can be selected so as to resonate at a desired frequency.

Selectivity, quality factor (Q), and resonant frequency are three parameters employed to assess a filter. Selectivity refers to the ability of a filter to differentiate between a desired signal and other undesired signals. The quality factor is a measure of the sharpness of the frequency selectivity of a resonant circuit.

When the LC tuned circuit 304 is employed as a filter, the C/L ratio determines the quality factor (Q) of the LC tuned circuit 304 and its selectivity. Further, high Q is required as the current circulating through the LC tuned circuit 304 resonates with greater amplitude at a higher Q than at a lower Q, and the signal response falls off more rapidly as the frequency moves away from resonance. As Q is proportional to selectivity, a higher quality factor indicates higher selectivity, so the LC tuned circuit 304 can more efficiently filter out signals from other stations that lie nearby on the spectrum.

The LC tuned circuit 304 performs three primary functions: removing unwanted signals; converting the single-ended RF signal into differential signals; and amplifying the RF signal. Behaving like a band pass filter, the LC tuned circuit 304 passes signals in a frequency band around the resonant frequency and blocks all other signals. The width of the pass band is inversely proportional to the quality factor and selectivity, and thus a high Q factor and high selectivity are required to narrow the pass band width, and thereby remove as many unwanted signals as possible. Thus, choosing appropriate inductor and capacitor values ensures that the LC tuned circuit 304 attenuates unwanted signals and passes desired signals.

The second function of the LC circuit, conversion, is performed by a property of the inductor 312 and the capacitors 314A and 314B. At resonance, the LC tuned circuit 304 stores the single-ended current signal. This single-ended current signal alternates between the capacitors 314A and 314B and the inductor 312, producing two 180 degrees phase-shifted current signals that flow in the capacitors 314A and 314B and the inductor 312. These 180 degrees phase shifted current signals are the differential current signals corresponding to the single-ended current signal at the input of the LC tuned circuit 304.

Figure 4:
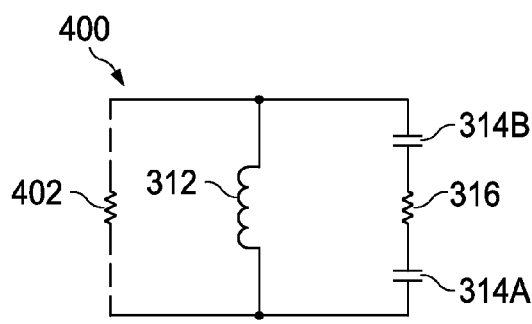
FIG. 4 depicts an equivalent diagram of an exemplary receiver front-end.

The third function of the LC tuned circuit 304, amplification, is shown in FIG. 4, which depicts an equivalent circuit 400 for the low-power receiver front-end 204 described in the embodiment 300. The equivalent circuit 400 is drawn looking into the LC tuned circuit 304 from the mixer 306. The input impedance 316 of the mixer 306 is in series with the capacitors 314A and 314B, and in parallel with the inductor 312, as depicted. The parallel impedance added by the inductor 312 is represented as a resistor 402 with dotted lines. This parallel impedance dampens the resonant frequency signals if no external input is provided to the LC tuned circuit 304. Further, as the capacitors 314A and 314B are in series, their combined capacitance becomes C (series combination of capacitances). The equivalent circuit 400 acts as a current magnification circuit, amplifying the differential current circulating in the LC tuned circuit 304 by the circuit's quality factor.

The equivalent circuit 400 operates as a parallel LC circuit, such that at resonance, the current circulating through the LC branch is a product of the input current signal and the Q of the LC tuned circuit 304. The quality factor Q is also sometimes called magnification factor. For a series LC circuit, Q represents voltage magnification; while for a parallel LC circuit, Q represents current magnification. Accordingly, the Q factor of a parallel LC circuit is the ratio of the current circulating in the parallel branches of the circuit to the input current signal, i.e., Q is proportional to the parallel impedance of the LC tuned circuit 304 and a ratio of the capacitors 314A and 314B to the inductor 312. The current magnification function of a parallel LC circuit is widely known in the art, and hence will not be described in detail here. Further, the impedance introduced by the mixer 306, i.e., the load impedance 308 and the input impedance 316 load the Q factor of the LC tuned circuit 304, thereby reducing its selectivity and current magnification factor. In order to maintain a high Q factor, the input impedance 316 and load impedance 308 of the mixer 306 is kept as low as possible.

As described previously, the LC tuned circuit 304 performs the three functions regarding the RF signal, and provides a differential, amplified, RF current signal, at the resonant frequency, to the mixer 306. The mixer 306 converts RF signals at one frequency into signals at another frequency to make signal processing easier and inexpensive. A reason for frequency conversion is to amplify the received signal at a frequency other than the RF. Typically, a mixer converts a RF signal into an IF signal for further processing. The mixer 306 accomplishes this conversion, by multiplying an input RF signal with a stable narrow frequency signal generated by a local oscillator. For sinusoidal signals, the multiplication of the two signals generates a signal with sum and difference frequencies. A low-pass filter can be present at the mixer 306 output to attenuate the sum frequencies. Consequently, at the output of the filter the difference frequency signal can be obtained, which is the intermediate frequency (IF) signal. In the illustrated embodiment, the mixer 306 is selected such that it has very low input impedance 316 and very low load impedance 308. Having a low impedance ensures that the LC tuned circuit's quality factor Q remains high.

The receiver front end 204 described with reference to FIG. 2-4, such as the embodiment 300 employing the LC tuned circuit 304, converts a single-ended input signal into differential current signals, and provides amplification for the differential current signals. Typically prior art solutions carried out this operation using a pair of transconductance amplifiers at the input, converting a single-ended voltage signal into a differential current signal, and another pair of transconductance amplifiers after the LC circuit to amplify the voltage generated by the LC circuit and to convert it back into a current signal. Using a single transconductance amplifier and the LC tuned circuit 304 to obtain differential signals results in reduction in power consumption, degradation in signal linearity, and noise levels. Further, as the input impedance 316 and the load impedance 308 of the mixer 306 are very low, the quality factor remains high, and the LC circuit can retain high selectivity.

Exemplary Method

Figure 5:
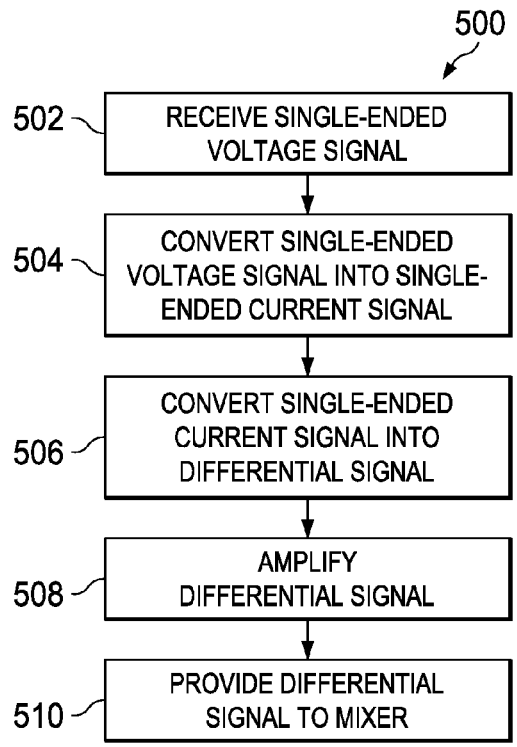
FIG. 5 is a flow diagram of an exemplary method for processing a received signal.

FIG. 5 is a flowchart of a method 500 for processing a single-ended signal before providing the signal to a mixer. The method 500 will be described with reference to components shown in FIGS. 2-4 and the accompanying description in the previous sections. Further, the method 500 includes the steps of receiving a single-ended voltage signal, converting the single-ended voltage signal into a single-ended current signal. The method 500 converts the single-ended signal into a differential current signal, amplifies the differential current signal by a quality factor of an LC tuned circuit, and provides the amplified differential current signal to the mixer.

At step 502, a communication receiver, such as the communication receiver 200 shown in FIG. 2, receives a single-ended voltage signal. As shown in FIG. 2, the signal is picked up by the antenna 202, which provides the signal to the low power receiver front-end 204. In the receiver front-end 204, a single transconductance amplifier (such as the TA 302), receives the voltage signal.

Moving to step 504, the single-ended voltage signal is converted into a current signal. In one implementation, the TA 302 provides this conversion. Moreover, the current signal obtained is proportional to the voltage signal.

The current signal is converted into a differential signal at step 506. An LC circuit, such as the LC tuned circuit 304, can convert the single-ended signal into a differential signal. At resonance, the current circulating through the LC tuned circuit 304 is 180° out of phase, thereby producing differential current signals.

Amplification is provided to the differential current signal in the next step, i.e., step 508. As shown in FIG. 3, the LC tuned circuit 304 provides input to the mixer 306. The value of the input impedance 316 of the mixer 306 is very low and the LC tuned circuit 304 together with the input impedance 316 acts as a current amplification circuit, amplifying the current by the quality factor of the LC tuned circuit 304. Further, the value of the quality factor depends on elements of the LC tuned circuit 304 and the input and load impedance of the mixer 306. Accordingly, suitable inductor 312, capacitors 314A and 314B, input impedance 316, and load impedance 308 values can be selected to achieve desired current amplification.

At step 510, the amplified differential signal is provided to the mixer 306. The mixer 306 has two input terminals to receive the differential current signal. Further, the mixer 306 includes ports to receive a constant and stable frequency signal produced by a local oscillator. The mixer 306 multiplies the differential current signal and the stable frequency signal to obtain the IF signal.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, and the like may be used solely to distinguish one entity or action from another entity or action without necessarily requiring or implying any actual such relationship or order between such entities or actions.

In addition, the order in which the methods are described is not intended to be construed as a limitation, and any number of the described method steps can be combined in any order to implement the methods, or alternate methods. Additionally, individual steps may be deleted from the methods without departing from the spirit and scope of the subject matter described herein. Furthermore, the methods can be implemented in any suitable hardware, software, firmware, or combination thereof, without departing from the scope of the claimed invention.

What is claimed is:

1. A receiver front-end comprising:
    a transconductance amplifier that produces a single-ended voltage signal in response to a single-ended current signal;
    an LC tuned circuit operatively coupled to an output of the transconductance amplifier, the LC tuned circuit resonates at a frequency of the single-ended current signal and generates a differential current signal in response to the single-ended current signal; and
    a mixer operatively coupled to an output of the LC tuned circuit;
        wherein the LC tuned circuit amplifies the differential current signal by a multiple of a quality factor of the LC tuned circuit;
        wherein the quality factor is proportional to parallel impedance of the LC tuned circuit and a ratio of capacitance to inductance of the LC tuned circuit.

2. The receiver front-end of claim 1 comprising exactly one transconductance amplifier.

3. The receiver front-end of claim 2, wherein the presence of the exactly one transconductance amplifier reduces power consumption of the receiver front-end and noise in the receiver front-end.

4. The receiver front-end of claim 1, wherein the transconductance amplifier receives a narrowband radio frequency signal.

5. The receiver front-end of claim 1, wherein the mixer has substantially low input impedance and substantially low load impedance.

6. A receiver front-end comprising:
    a transconductance amplifier that produces a single-ended voltage signal in response to a single-ended current signal;
    an LC tuned circuit operatively coupled to an output of the transconductance amplifier, the LC tuned circuit resonates at a frequency of the single-ended current signal and generates a differential current signal in response to the single-ended current signal; and
    a mixer operatively coupled to an output of the LC tuned circuit;
    wherein the LC tuned circuit includes:
        a series combination of an inductor and a first capacitor; and
        a second capacitor coupled in parallel with the series combination.

7. The receiver front-end of claim 6, wherein the first capacitor and the second capacitor provide AC coupling between the LC tuned circuit and the mixer.

* * * * *